United States Patent [19]

Drukarch

[11] 4,068,309
[45] Jan. 10, 1978

[54] METHOD AND DEVICE FOR DETECTING TWO DIFFERENT FREQUENCY AMPLITUDE AND PHASE SIGNALS IN A COMBINED DIGITAL SIGNAL

[75] Inventor: Chaim Zalman Drukarch, Amsterdam, Netherlands

[73] Assignee: De Staat der Nederlanden, te Dezen Vertegenwoordigd Door de Directeur-Generaal der Posterijen, Telegrafie en Telefonie, The Hague, Netherlands

[21] Appl. No.: 741,706

[22] Filed: Nov. 15, 1976

[30] Foreign Application Priority Data

Nov. 18, 1975 Netherlands .......................... 7513456

[51] Int. Cl.² ...................... G06F 15/20; G01R 23/14
[52] U.S. Cl. ................................ 364/484; 324/79 D; 328/139
[58] Field of Search ................... 235/152, 156, 151.31; 324/77 B, 78 D, 79 D; 328/138, 139, 141

[56] References Cited

U.S. PATENT DOCUMENTS

| 3,526,842 | 9/1970 | Andrew | 328/139 X |
| 3,803,390 | 4/1974 | Schaepman | 235/152 |
| 3,820,021 | 6/1974 | Clarisse | 324/79 D X |

*Primary Examiner* — Jerry Smith
*Attorney, Agent, or Firm* — Hugh A. Kirk

[57] ABSTRACT

Method for detecting, in a combined digital signal, the presence of two signals differing in frequency, amplitude and phase and having frequencies occurring in a known series. Samples of the combined signal are multiplied by samples of only one derivative of each of the frequencies of the known series. This derivative is formed by the product of a modulating factor formed by the samples of a frequency which is the sum or the difference of (a) a fixed frequency of 2000 Hz and the frequency to be detected in the known series and (b) a factor allowing a filtering at the said fixed frequency and formed by the samples of the sine of the fixed frequency shifted by 45°. These products are alternately stored in accumulators until after a certain time the presence of certain frequencies is deduced from the sum of the products in the accumulators by means of comparison.

5 Claims, 3 Drawing Figures

METHOD AND DEVICE FOR DETECTING TWO DIFFERENT FREQUENCY AMPLITUDE AND PHASE SIGNALS IN A COMBINED DIGITAL SIGNAL

BACKGROUND OF THE INVENTION

The invention relates to a method for detecting, in a combined digital signal, the presence of two signals differing in frequency, amplitude and phase and having frequencies occurring in a known series, such as in an R2 signalling system. Samples of the combined signal are multiplied by samples of at least one derivative of always one of the frequencies of the known series. These products are stored in accumulators until after a certain time the presence of certain frequencies is deduced from the sum of the products in the accumulators by means of comparison.

A method of this kind is known and can be used for various purposes. (see Australian published patent application No. 59138/73 published Feb. 10, 1975). One of the possible uses is for the analysis of digitally received MFC-signals (multi-frequency code signals). Another possible uses is in push-button voice frequency code signalling. Since the method can best be utilized in a digital connection, it is also imaginable to utilize the method in an analog connection, and because the apparatus utilizes digital techniques, it can be used in more than one way. Thus a digital result is immediately suited for further digital processing, if necessary together with other data, and a lower dissipation is often obtained. Although the analog-digital conversion may present difficulties in some cases, however in an analog connection one is free in choosing the parameters when sampling, such as the moments of sampling and the number of levels to be distinguished.

SUMMARY OF THE INVENTION

According to the known method, uses is made of two derivatives of always one of the frequencies hunted for, which derivatives are capable of being filtered out. These derivatives are e.g. the sine and the cosine. So for each series of six frequencies of the R2 signalling system, it is necessary to effect twelve multiplications for each signal sample received. The results obtained are cumulated in accumulators for each frequency. The two sum signals can be processed in various ways. The greatest of the absolute values can simply be taken as determinative for the frequency hunted for, the absolute values can be added, the values can be squared and then be added, and so forth. By comparing the six values that have thus resulted, the two frequencies of the series that have been hunted for are indicated.

The invention is based on the understanding that only one multiplication can suffice to obtain two sum signals. The attendant advantages are: that for each frequency to be detected only one series of signals needs to be stored; that the number of processes is reduced by one half; and that, thanks to this reduction, the store room required for storing the results is limited.

The invention is characterized in that the samples of the combined signal are multiplied by the samples of only one derivative for each frequency, the derivative being formed by the product of a modulating factor formed by the samples of a frequency, which is the sum or the difference of a fixed frequency of 2000 Hz and the frequency to be detected in the known series, and a factor allowing a filtering at the said fixed frequency and formed by the samples of the sine of the fixed frequency shifted by 45°.

The invention also relates to a device for carrying out the method. This device comprises a circuit for each frequency to be detected, which circuit is provided with a store for recording the said derivative, with a gate for the multiplication of the derivative by the signal to be detected. Two accumulators are provided for alternately recording the output signal of the gate, with a totalizator for adding, after some time, the absolute values of the contents of the accumulators. A device is also provided for comparing the results of the totalizators for the different frequencies and for indicating the frequencies hunted for.

BRIEF DESCRIPTION OF THE VIEWS

The above mentioned and other features, objects and advantages and a manner of attaining them are described more specifically below by reference to an embodiment of this invention shown in the accompanying drawings, wherein.

DETAILED DESCRIPTION OF PREFERRED EMBODIMENT

Figure 1:
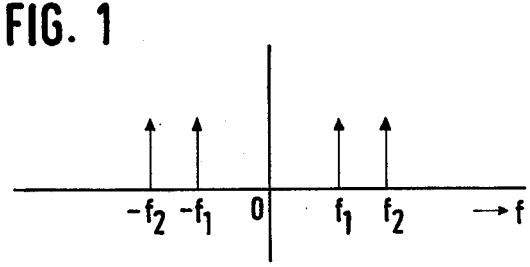
FIG. 1 is a graph of the spectral image of a signal consisting of two components.
Figure 2:
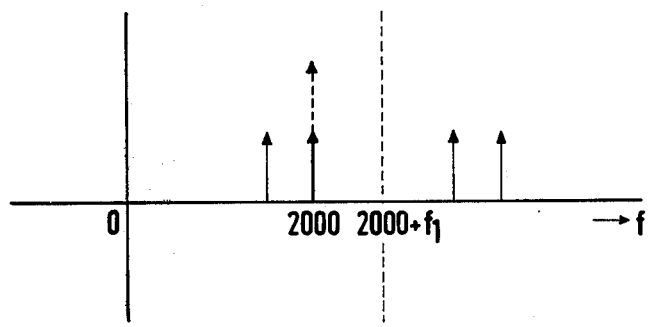
FIG. 2 is a graph of the spectral image of the same signal shown in FIG. 1 after modulation, and FIG. is a schematic block wiring diagram of a preferred embodiment of the invention.

If an incoming signal consists of two components with the frequencies $f1$ and $f2$, then the spectral image shows peak values for the frequencies $-f2$, $-f1$, $+f1$ and $+f2$ (FIG. 1). In the case of a modulation with a frequency of (2000 Hz $\pm f1, f2 \ldots f6$) the image is shifted by that value. A modulation with 2000 Hz $+f1$ causes a higher peak value in the case of a frequency of 2000 Hz, if $f1$ is one of the components (FIG. 2). So it is only necessary to filter out at a frequency of 2000 Hz. The frequency of 2000 Hz has been chosen, because in the case of a sampling of 8000 Hz, as it is usual in PCM-systems (pulse current modulation systems), the samples successively have the following values: 0, +1, 0, −1, 0, +1 etc. If the 2000 Hz frequency is shifted by 45°, then the series of values will be +1, +1, −1, −1, +1, +1 etc. By adding the absolute values of the cumulated result of the multiplication of such a series and the modulated signal, and a comparison of the results of the investigation with other frequencies of the $f1, f2 \ldots f6$ series, the components asked for can be easily shown.

Figure 3:
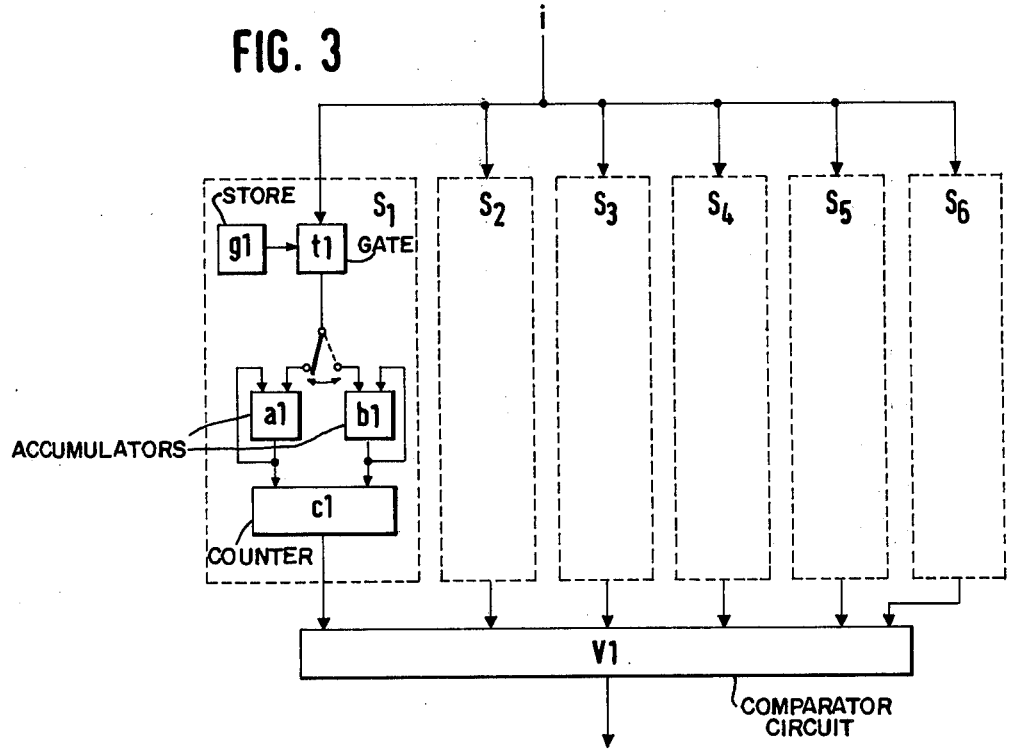

FIG. 3 shows a schematic block wiring diagram of a circuit for detection device according to the invention. The unknown signals are supplied via a line or conductor $i$ and passed on to six sections S1 - S6, which are each adapted for the frequency of one component, but which are identical as to their construction and working. That is why only the section S1 is shown in detail. A store $g1$ contains the storage of the samples of a signal formed by the multiplication of the modulation frequency (2000 Hz $+f1$) by the frequency of 2000 Hz shifted by 45°. For this combined signal it is sufficient to record in the store the whole series of signals or a representative part of such series (see applicant's assignee's copending continuation-in-part U.S. patent application, Ser. No. 751,456 filed Dec. 16, 1976). In this way storage room is saved. In a gate circuit $t1$ the series of signals is multiplied by the signal $i$ supplied, which multiplication consist only in the determination of the signal.

The values resulting from this operation are alternately added in the accumulators $a1$ and $b1$ to the values that are already present in these accumulators. After a predetermined number of samples, e.g., 200, dependent on the desired filtering, the absolute values of the accumulators $a1$ and $b1$, if necessary after having been squared, are counted in a counting circuit $c1$.

The above takes place in all the sections $S1 - S6$ for the respective frequencies $f1 - f6$. The results are compared in a device $V1$ and on the basis of the differences in values, and the absolute values the presence of certain frequency components in the signal $i$ is determined.

While there is described above the principles of this invention in connection with specific apparatus, it is to be clearly understood that this description is made only by way of example and not as a limitation to the scope of this invention.

What we claim is:

1. A method for detecting, in a combined digital signal, the presence of two signals differing in frequency, amplitude, and phase and having frequencies occurring in a known series, said method comprising: multiplying samples of the combined signal by samples of at least one derivative of always one of the frequencies of the known series; storing the resulting products in accumulators, and then after a certain time deducing the presence of certain frequencies from the sum of the products in the accumulators by means of comparison; wherein: said samples of the combined signal are multiplied by the samples of only one derivative per frequency; wherein said derivative is formed by the product of a modulating factor formed by the samples of a frequency which is the algebraic sum of a fixed frequency of 2000 Hz and the frequency to be detected in the known series; wherein the sine of said fixed frequency is shifted by 45°; and further wherein said fixed frequency is filtered out by said comparison.

2. A device for detecting in a combined signal, the presence of two signals differing in frequency, amplitude, and phase, and having frequencies occurring in a known series, said device including a circuit for each frequency to be detected, said circuit comprising: a store ($g$) for recording one of the frequencies of the known series multiplied by a fixed frequency, a gate ($t$) for the multiplication of the said stored frequency by the signal to be detected, two accumulators ($a$, $b$) for alternately recording the output signal of said gate ($t$), a totalizator ($c$) for adding, after some time, the absolute values of the contents of said accumulators ($a$, $b$), and a device ($V$) for comparing the results of the totalizators for each of said different frequencies and for indicating the frequencies hunted for.

3. A device according to claim 2 wherein said fixed frequency is 2000 Hz.

4. A device according to claim 2 wherein said fixed frequency in said store is shifted 45°.

5. A device according to claim 2 wherein said comparing device includes a filter for said fixed frequency.

* * * * *